United States Patent
Boughman et al.

(10) Patent No.: US 6,718,025 B2
(45) Date of Patent: *Apr. 6, 2004

(54) SYSTEM AND METHOD FOR TOLL NOTIFICATION WHEN PLACING A CALL

(75) Inventors: Glenn Ralph Boughman, Cumming, GA (US); Wendy Kay Kropenick, Cumming, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/402,413

(22) Filed: Mar. 28, 2003

(65) Prior Publication Data

US 2003/0185373 A1 Oct. 2, 2003

Related U.S. Application Data

(63) Continuation of application No. 09/539,975, filed on Mar. 31, 2000, now Pat. No. 6,570,973.

(51) Int. Cl.[7] .......................... H04M 3/42; H04M 7/00; H04M 15/00
(52) U.S. Cl. ........................ 379/207.02; 379/114.29; 379/121.01; 379/221.08; 379/222; 455/406; 455/414
(58) Field of Search .................. 379/88.12, 93.02, 379/112.01, 112.06, 112.07, 114.01, 114.28, 114.29, 121.01, 130, 201.01, 220.01, 221.02, 221.09, 221.14, 222; 455/406, 414

(56) References Cited

U.S. PATENT DOCUMENTS

| | | | | |
|---|---|---|---|---|
| 5,661,792 A | * | 8/1997 | Akinpelu et al. | 379/221.13 |
| 5,742,667 A | * | 4/1998 | Smith | 379/112.09 |
| 6,078,657 A | * | 6/2000 | Alfieri et al. | 379/220.01 |
| 6,411,693 B1 | * | 6/2002 | McKeeth | 379/130 |
| 6,570,973 B1 | * | 5/2003 | Boughman et al. | 379/207.02 |

* cited by examiner

Primary Examiner—Harry S. Hong
(74) Attorney, Agent, or Firm—Cantor Colburn LLP

(57) ABSTRACT

A system and method for alerting wireless telephone users whether a call is a toll call. This invention provides communication subscribers with a notification when placing a toll call to either other wireless or landline subscribers. The notification may be a toll notification informing the subscriber that a long distance call is about to be placed. The notification means may be a pre-recorded message, tone alert, e-mail message or any other means of alerting the user. Advantageously, the caller may terminate the call upon notification that he has engaged in a toll call, prior to the call being connected to the called party. The result is that the user is fully aware and in control when placing calls that he may not recognize are toll calls, due to impacts from local number portability or roaming of the wireless user.

15 Claims, 2 Drawing Sheets

SYSTEM AND METHOD FOR TOLL NOTIFICATION WHEN PLACING A CALL

CROSS-REFERENCE TO RELATED APPLICATIONS

This application is a continuation of U.S. patent application Ser. No. 09/539,975 filed Mar. 31, 2000, now U.S. Pat. 6,570,973, the contents of which are incorporated by reference herein in their entirety.

FIELD OF THE INVENTION

This invention relates to the telephone industry and, more specifically, to a system and method for toll notification when placing a call.

BACKGROUND OF THE INVENTION

We as humans thrive on communication. Past methods of communication include smoke signals, Pony Express messengers, notes in bottles and any other conceivable method that allowed for communication between two people. However, times have changed! The advent of the telegraph simplified and expedited communication. Next, came communication over wires, transmitting voice and data over a wire or line, using telephones and similar devices (facsimile, computer modem) that are present in our homes, offices, schools, businesses, etc. and that connect to the public switched telephone network (PSTN) through wireline (also referred to as landline). Wired communication satisfied the human need for communication for many years, but once again, humans wanted more. As society grew, we became mobile, movers and shakers, who needed to keep in touch no matter where located. This need to cut the umbilical cord of wired communication brought forth wireless communication. Wireless communications are transmitted through radio frequency (RF) technology. Wireless communications include communications that are transmitted via cellular telephones, mobile telephones, car phones, personal communication service (PCS) units, pagers, Palmpilots™ and the like.

A wireless device is particularly useful to a person on the move. For example, you can use a wireless unit while driving, while flying or during any other activity that requires the user to be separated from access to a landline. A service provider or carrier provides the wireless communications service to your mobile wireless unit. But a subscriber's mobility may take him out of the service area served by his service provider. If the new area is served by a different service provider with whom the subscriber has no business relationship, the subscriber is said to be "roaming" out of the home service area and is called a "roamer" in a visited service area.

In addition to the mobility of wireless users, the mobility of humans also brought about another advancement to telephony, number portability (NP), which would include all types of portability including local number portability. NP aims to let the customer take their phone number anywhere they go. For example, when a customer moves from Atlanta, Ga. to Fort Lauderdale, Fla. they can continue using their "Atlanta" local telephone number. Therefore, area codes will no longer indicate geographic location.

Both NP and geographic mobility means that a communication user may not know when she is making a toll call. When a typical call is placed, the user dials a ten digit number and the call is connected. In the past, users knew that a number with a "202" area code was for Washington, D.C., "212" for New York, "404" for Atlanta, etc. These defaults alone were enough for users to determine that they were making a more expensive toll call. Now, and increasingly as NP permeates the industry, a user has no indication whether his call is a toll or local call. This same problem will arise in landlines when full NP is implemented. No longer will an area code assist the caller in determining whether a call is toll free. Thus, a system is needed that notifies a user when engaging in toll calling.

SUMMARY OF THE INVENTION

The present invention is a system and method for notifying users of a telephony system that a toll call is being made. In one embodiment, this invention notifies customers that a dialed number is a toll number by either an audio tone, prerecorded message, visual message or other means of notification. The invention determines toll notification by:

capturing a dialed number;

translating the dialed number to a local routing number (LRN);

triggering a query to a programmable network element (e.g., a service control point 10 (SCP)), where the LRN is determined;

determining where the call should be routed;

comparing the call to the customer's billing plan;

triggering a notification if the data from the programmable network element indicates a toll call; and/or allowing the user the option to terminate the call.

The notification can also present the user other options. For example, the notification can present the user with the option to choose the long distance carrier with which to place the call. Other notifications may include the ability to terminate the call and access the called party's voice mail, e-mail, or any other alternative method of communication available to the caller.

In one embodiment for use with cellular telephones, when a call is placed by a caller to the called party, a mobile switching center (MSC) translates the call. The MSC queries an intelligent network database, which may be located in a switching control point (SCP) or other network element capable of accepting queries and storing databases. A network element comprises a device capable of (a) communication over a network with other devices and (b) processing communications. Examples of network elements include mobile switch centers, SCPs, SSP switches, etc. The query aims to determine the routing information necessary to connect the call and to determine whether the call is a toll call. To that end, the query provides routing information to the network element that allows the network element to determine the call status. Routing information can include the caller's number, the called party's number, or an identifier for the MSC.

In order to assure that current information is updated to the Intelligent Network (IN) database, a link is established between the carrier billing system and the IN database. The billing system provides the IN database with current user plans that would involve toll charges. In addition, the information from the billing database can be used to determine if there are any long distance pricing options that can be offered as alternatives to caller's current pricing plan.

The network element returns a message, such as an SS7 message, to the MSC. The message indicates the call status, such as whether the call is a toll call or not. If the call is not a toll call the call is completed. In contrast, if the IN network returns a message that a toll call has been made the SS7 message is sent back to the MSC to alert the caller. The above functionality can also be carried out using various messaging protocols, such as an Intelligent Peripheral type network connection or another network such as IP.

The present invention aims to accomplish one, multiple or combinations of the following objectives:

- to ascertain the status or type of communication being placed;
- to alert a communication user that a toll call is being placed;
- to allow other types of notifications to the user based on the status of the user's desired action; and
- to reduce unintended toll calls by the user.

Further objects and advantages will become apparent from the following description, the accompanying drawings and the claims.

DETAILED DESCRIPTION OF THE DRAWINGS

This detailed description first provides an overview of an embodiment of the present invention. Then a description of an operation environment is discussed. Lastly, a detailed description of the operation of an embodiment is provided with reference to FIGS. 1 and 2.

Overview of the Toll Notification Method and System

This invention provides communication subscribers with a notification when placing a toll call to either other wireless or landline subscribers. The notification may be a toll notification informing the subscriber that a long distance call is about to be placed. The notification means may be a pre-recorded message, tone alert, short message, e-mail message or any other means of alerting the user. Advantageously, the caller may terminate the call upon notification that he has engaged in a toll call, before the call being connected to the called party. The result is that the user is fully aware and in control when placing calls that he may not otherwise recognize are toll calls, due to impacts from local number portability or roaming of the person being called. Another advantage of the present invention is that the service provider may monitor the user's billing plan and determine if there are other billing options that are more advantageous for the user. By doing so, the service provider can notify the user about the provider's billing options.

Figure 1:
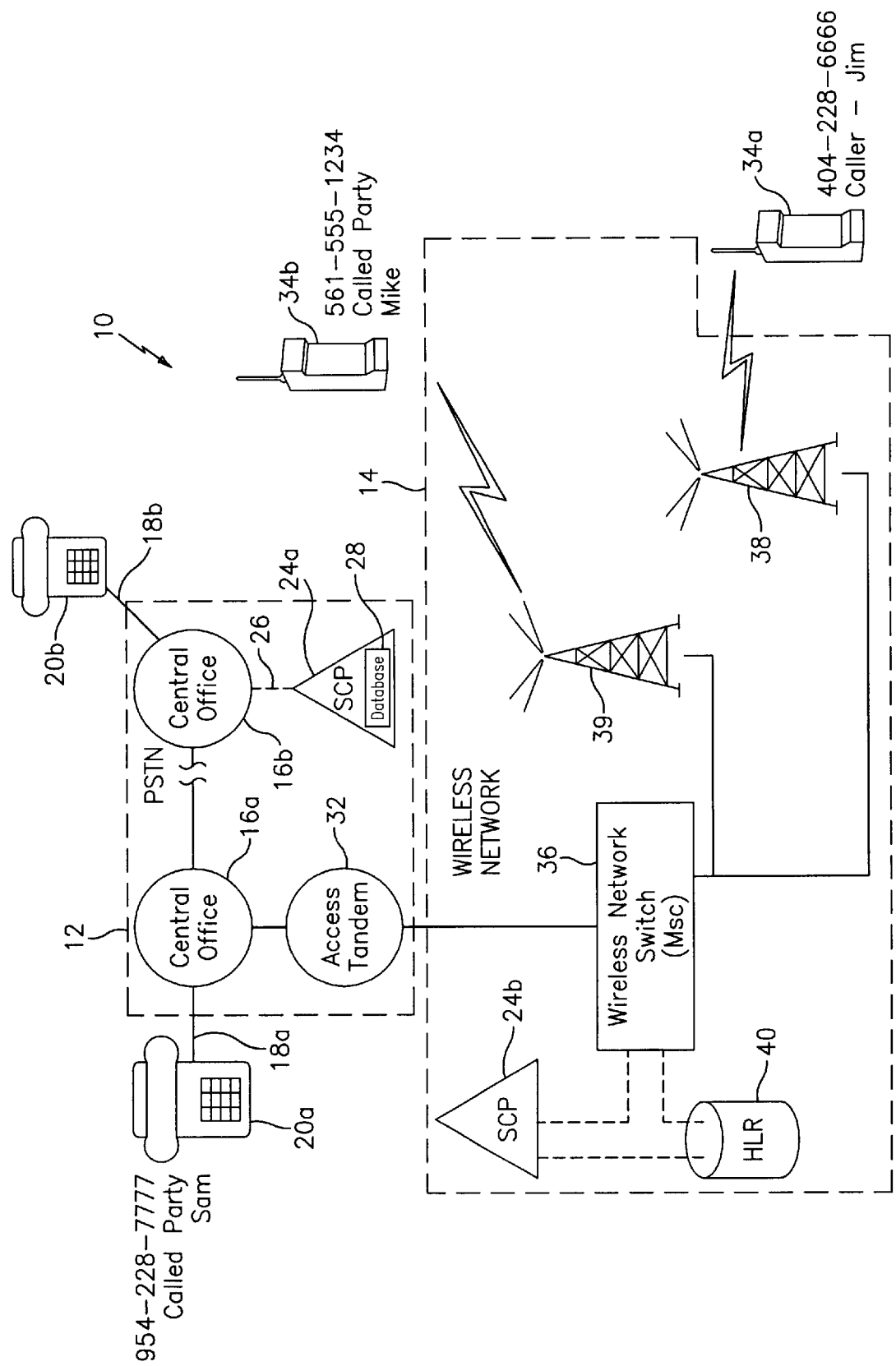
FIG. 1 is a diagram of a wireless and landline telephone system.

FIG. 1, in which like numerals indicate like elements, is a diagram of the preferred environment of the present invention. The preferred environment is a telecommunication system 10 that includes the public switched telephone network (PSTN) 12 and a wireless telecommunications network 14 (also referred to as a wireless phone network).

The Wireless Network

Wireless refers to the fact that the terminating equipment in the wireless network is not connected by any "wirelines" or wires to the network elements. The terminating equipment in a wireless network, referred to herein as "wireless units," receive communications through radio signals rather than through copper wires or fiber optics. A cellular telephone network is an example of a wireless network. Thus, a wireless unit may include a cellular telephone, a mobile phone, a mobile station, a portable telephone and other devices that receive communications through electromagnetic (e.g., radio) signals rather than through copper wires or fiber optics. Even though a cellular mobile radiotelephone (CMR) system is used as an example in this detailed description, it should be noted, however, that the use of the present invention is not limited to a CMR system. The present invention also may be used in connection with the Future Public Land Mobile Public Telephone Service (FPLMTS), Personal Communication Services (PCS), Enhanced Specialized Mobile Radio Services (ESMR), and other wireless systems.

As illustrated in FIG. 1, and as will be well known to those skilled in the art, access tandem 32 connects public service telephone network (PSTN) 12 to a wireless network 14. The connection of PSTN 12 to the wireless network 14 through an access tandem 32, or similar network element, allows for the interconnection of these two separate communication systems.

A wireless network includes a geographic radio service area divided into cells. Each cell is generally serviced by a broadcast antenna 38 and 39 to permit communications between wireless units 34a, 34b operating within the area of the cell and a cell control, also known as a base station (not shown). The base station, in turn, is connected to a wireless network switch, also referred to as a mobile switching center (MSC) 36. MSC 36 may communicate with the base station either through dedicated telephone facilities, or more frequently, through a cell-to-mobile switching center data link between the base station and MSC 36. If a wireless unit is associated with a subscriber of that particular wireless network, then the registration information is stored in a home location register (HLR) 40. Therefore, the wireless unit is considered to be operating within its home territory. Alternatively, if the wireless unit is not associated with a subscriber of that particular wireless network, then the registration information is stored in a visitor location register (VLR) (not shown). In that case, the wireless unit is considered to be a visitor or roamer to the geographic area serviced by MSC 36. If necessary, the pertinent information relating to a particular wireless unit is obtained from a wireless network switch that is deemed to be the "home" switch of a particular unit. HLR 40 and VLR registers are used by the wireless network to work with PSTN 12 in the routing of communications to and from wireless units and through PSTN 12.

FIG. 1 illustrates only the basic elements of a wireless network 14 necessary to the understanding of the operation of the present invention. As illustrated in FIG. 1, wireless network 14 couples to PSTN 12 via access tandem 32 and MSC 36. Switch 36, in turn, couples to an antenna 38, which transmits and receives information from wireless network switch 36 and a wireless unit 34a, 34b. Wireless network switch 36 includes a home location register (HLR) 40, but may also include a visitor location register (VLR). Also, the registers may be located in other wireless network elements such as MSC 36. The use of SCP 24b in the wireless network serves the same purposes as SCP 24a in PSTN 12 as later described.

The Public Switched Network

PSTN 12 contains Advanced Intelligent Network (AIN) elements of a typical local exchange carrier. The AIN comprises a plurality of end or central offices, which are indicated as central offices 16a, 16b in FIG. 1. The broken line between the central offices 16 indicates that the number of central offices is arbitrary. The AIN also comprises non-SSP central office switches, which are not shown in FIG. 1. The difference between SSP and non-SSP switches is that an SSP includes intelligent network functionality including appropriate hardware and software so that, when a set of predetermined conditions are detected, the SSP initiates a trigger for a predetermined state of a call on a subscriber's directory number, generates the trigger as an appropriate message in the form of a query to be sent out over the network, and suspends the handling of a call until the SSP receives a reply from the network instructing the SSP to take a certain action. A non-SSP switch is an electronic switch that can generate certain rudimentary signaling over the network, but the non-SSP switch must rely on other equipment to provide subscriber lines connected to such a non-SSP switch with more complex features and services available in the AIN.

As further illustrated in FIG. 1, SSP switches 16a, 16b have a plurality of subscriber lines commonly designated as 18 connected thereto. Each subscriber line 18 connects to a piece of terminating equipment, including a plurality of telephones commonly designated as 20. Although telephones are in FIG. 1, those skilled in the art will understand that other terminating equipment such as facsimile machines, computers, modems, etc. may be in place of telephone units 20. For purposes of this patent application, these telephone and other terminating equipment are generally referred to as wireline units because they connect by subscriber lines to PSTN 12.

Each piece of terminating equipment in an AIN is assigned a directory number. In the description of the present invention, the term "directory number" is used in its generally understood meaning to be the number that is dialed or input by a caller or source and used by the network to route the communication so as to reach a piece of terminating equipment associated with the dialed directory number. An example of a directory number is a telephone number.

Multiple trunk circuits interconnect switches 16a, 16b. These are the voice path trunks that interconnect the central office switches to connect communications. Each network SSP including switches 16a, 16b, are typically connected to a local signal transfer point (STP) (not illustrated) via respective data links. These data links employ a well known signaling protocol called Signaling System 7 (SS7).

Much of the intelligence of the AIN resides in a programmable network element, such as SCP 24a. Typically, the SCP connects to one or more SSPs through a respective one or more STP's over SS7 data links. For the sake of simplicity, in FIG. 1, SCP 24a is illustrated as connected to central office 16b over an SS7 data link 26 as indicated by the dashed line. Among the functions performed by SCP 24a is the maintenance of network databases which are used in providing telecommunication services. In addition, SCP 24a includes databases such as the illustrated subscriber information database 28 that identify particular service subscribers and the services to be accorded to these subscribers. In addition, other databases such as, for example, billing databases can be included in SCP 24a.

In order to keep the processing of data and calls as simple as possible, a relatively small set of triggers are defined at the switches for each call. A trigger in the AIN is an event associated with a particular subscriber line that generates a packet to be sent to an SCP. The trigger causes SCP 24a to query its database to determine if the called party is serviced by SSP 16a, or if not, to determine how to route the call to the proper SSP. In response to receiving a message from SCP 24a, SSP 16a moves through its call states, and generates further call signaling messages that are used to set up and route the call.

The AIN may also include other elements and connections that have not been described herein unless their form or function is affected as a result of the implementation of the present invention in the AIN. The foregoing descriptions of wireless network 14 and PSTN 12 were limited to only single or very few examples of particular network elements and their respective interconnections. From this basic explanation of these network elements and their respective interconnections, those skilled in the art will understand the operation of the present invention in the context of the increased complexity in today's communication systems.

Operation of the Toll Notification Method and System

As noted above, the present invention generally provides wireless users with notification when placing a call to other wireless or landline subscribers. Pursuant to this service, a pre-recorded message, tone alert, short message, e-mail or any other means alerts the user to the call's toll status, allowing the user to continue or terminate the call. Advantageously, the user is fully aware and in control when placing toll calls.

A general example is provided with reference to FIG. 1. Jim, a wireless user, with wireless unit 34a, travels out of his service area in Atlanta to West Palm Beach, Fla. Jim wants to call Mike, another wireless user with wireless unit 34b, who lives in Palm Beach, Fla. So Jim dials Mike's telephone number, (561)555-1234 and the call is connected. Before this invention, Jim, in making the call, had no way of knowing if the call is a toll call, other than associating the area code with Palm Beach. Not until Jim received his billing statement would he have learned that he made a toll call to Mike. In another scenario, Jim decides he wants to call Sam, a landline subscriber with wireline unit 20a, in Fort Lauderdale, Fla. while Jim is still in West Palm Beach, Fla. As before, Jim picks up his wireless unit 34a and dials Sam's telephone number, (954)228-7777. Before this invention, the call is connected to Sam through wireless network 14 and PSTN 12 and not until Jim receives his bill does he learn that he made a toll call. When Jim gets his billing statement he may become frustrated because he was in the same town as Mike, but was charged for a toll call. In most instances, even when Jim is local to Mike, Jim's provider charges for a long distance toll call, because Jim's home location is Atlanta, Ga.

The present invention does not change this scenario, but rather, provides an additional service. In the preferred embodiment of the present invention, Jim's dialing of Mike or Sam's directory number results in a query to SCP 24b, or equivalent network element, to determine where the called party is located. SCP 24b queries other elements to determine which switch in wireless 14 or PSTN 12 network serves the called party. All these queries occur before the call connects through to the called party. The query returns data indicating how to route the call and whether the call is a toll call. Before the call is connected, the SCP evaluates the query. The MSC then notifies the caller by a prerecorded message or tone alert. At this point, Jim can continue the call or terminate the call before being connected.

Flow Diagram of the Toll Notification Method and System

Figure 2:
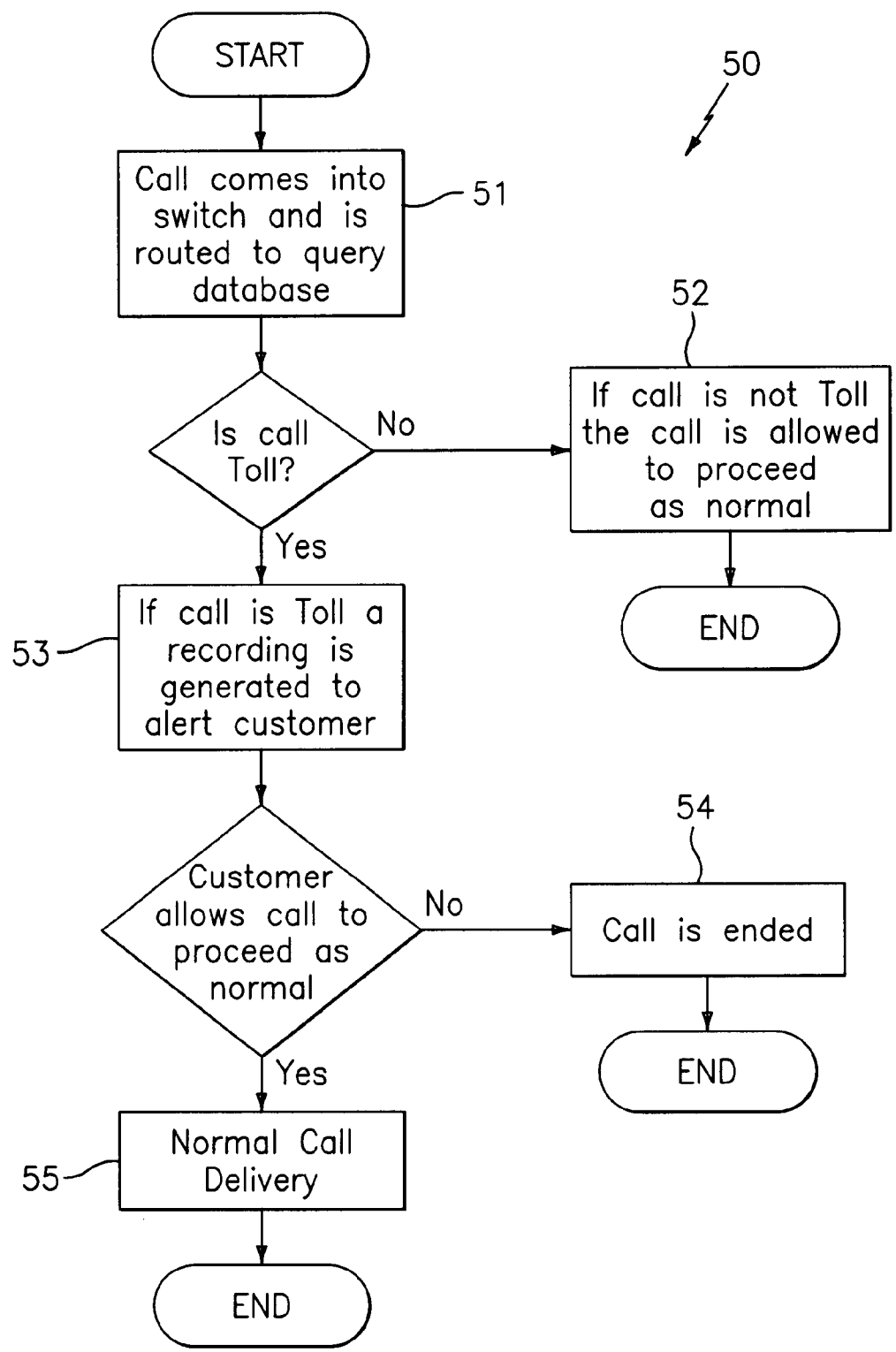
FIG. 2 is a process flow diagram of the operation of the present invention.

For a straightforward explanation of the operation of the preferred embodiment as described above in connection to FIG. 1, a flow diagram 50 of the telecommunication toll notification system is provided in FIG. 2.

Referring to FIG. 2, when Jim calls either Mike or Sam, the call first enters MSC 36 for translation. MSC 36 queries the intelligent network database located in SCP 24a or other network element capable of accepting queries and storing databases. The call is routed from MSC 36 to SCP 24a to determine the routing information necessary to connect the call and to determine whether the call is a toll call 52.

In order to assure that current information is updated to the Intelligent Network (IN) database, a link should be established between the carrier billing system and the IN database. This link can be done using an Intelligent Peripheral (IP) type network connection. The billing system would keep the IN database updated with current user plans that would involve toll charges. In addition, the information from the billing database can be used to determine if there are any long distance pricing options that can be offered as alternatives to the caller's current pricing plan.

A return SS7 message is sent back to MSC 36 from the IN network element to indicate if the call is a toll call 53 or not 52. If the call is a non-toll call 52, the call may be automatically completed. In contrast, if the IN returns a message that a toll call has been made, the SS7 message is sent back to MSC 36 to alert caller 53. This message could also be sent to other platforms, for example, a short message service center, for delivery of the toll notification. The caller, upon hearing the alert, may terminate call 54 or proceed with call 55. MSC 36 and IN timers can be set to allow the caller sufficient time to abort the call. However, it is recommended that this timer be kept to a minimum as to not add any more processing time to the call. In general, the length of time of the recording should be more than sufficient.

The present invention provides a system and method for notifying callers of the placement of a toll call, particularly roaming wireless users, in such a way as to decrease unwanted toll calls for wireless users. The process applies to cell phones and to PCS phones that operate under various standards, such as Advanced Mobile Phone Service (AMPS), Call Division Multiple Access (CDMA), Time Division Multiple Access (TDMA), etc. Nonetheless, the principals of the present invention may be applied to other communication devices operating under other standards with the appropriate reconfiguration. Furthermore, the present invention applies to wired PSTN systems in light of the proliferation of Number Portability.

Alternative Embodiments

The principles of the present invention may be adapted for other applications. In its broadest sense, this invention (a) determines the status of a communication and then (b) processes the communication based on its status. The exemplary embodiment determines the status of whether the communication is a toll communication. Other status inquiries are possible, including by way of example whether the communication is a data communication, whether the communication is to be routed over a TCP/IP versus telecommunications network, a determination of whether the calling party has paid its bills, a determination of whether the called party has authorized calls from the particular calling party to be delivered, a determination of whether the called party desires the user to send another type of communication (such as e-mail or facsimile). Likewise, the processing step can be modified, based on the exact nature of the determining step and its outcome.

Further, in the embodiment described above, while the determining step may be accomplished by querying a database, other methods are possible. By way of example, skilled persons will recognize that instead of formulating a query that provides the called party's number, the invention could instead determine the switch to which the communication is to be routed to or from which the communication comes. A relational database can then be used to compare the switch identity with the switch geographic location. Upon determination of the switch geographic location, the invention can compare the destination switch location and the originating switch location against a toll plan to determine whether the communication is a toll call. Additionally, skilled persons will recognize that this alternative embodiment of the invention can be carried out in a variety of network elements, such as in a properly programmed MSC controlling a mobile calling party's communication. Or, a computer processor can be coupled to that MSC to carry out the invention. Indeed, there are advantages to such an embodiment given that the MSC already must receive the destination switch's information in order to route the call.

The foregoing is provided for purposes of illustrating, explaining, and describing embodiments of the present invention that alerts a telephone user of the status of a call. For example, the alert can notify the user whether the recipient is on a cellular plan that charges the caller for the call. Additionally, the alert can inform the caller whether the call is a toll call, and if so, whether the called party has an e-mail address. The alert can also allow the caller to suspend the long distance call and enter the called parties voice mail system to leave a voice message, or enter a interactive response unit to send a numeric pager or predefined text message. Modifications and adaptations to these embodiments will be apparent to those skilled in the art and may be made without departing from the spirit of the invention or the scope of the following claims.

What is claimed is:

1. A system for alerting a user who has a first communication unit with an identifier used for communication routing, comprising:
   a. a first network element operative;
      (1) to receive a communication directed to a second communication unit; and
      (2) to request communication processing instructions from a second network element;
   b. the second network element being in communication with the first network element, he second network element being operative;
      (1) to determine the type of communication to the second unit, based on the user's billing plan;
      (2) if the communication is a toll call, to provide instructions to the first network element to provide the user notification concerning the nature of the call; and
      (3) if the user desires to complete the call, to provide the communication processing instructions to the first network element.

2. The system of claim 1, wherein the first network element is a switch selected from the group consisting of a service control point, an intelligent peripheral, a database, and a computer workstation.

3. The system of claim 1, wherein the notification to the user's an alert selected from the group consisting of a pre-recorded audible message, an audible tone, an indicator light, a text message, an icon, short message or an option to be sent to a interactive response unit.

4. The system of claim 1, wherein the second network element is a service control point or an intelligent peripheral.

5. A method for providing a notification to a user who has a first communication unit with an identifier used for communication routing, comprising:
   a. capturing a dialed number;
   b. translating the dialed number to a local routing number (LRN);
   c. triggering a query to a network element, where the LRN is looked up;
   d. comparing call to the user's billing plan to determine whether the call is a toll call;
   e. notifying the network element of the nature of the call;
   f. triggering a notification to the user of the nature of the call; and g. allowing the user the option to respond to the notification.

6. The method of claim 5, wherein the triggered query is received by a service control point or intelligent peripheral.

7. A system for providing a notification to a user who has a first communication unit with an identifier used for communication routing, comprising:
   a. a first network element to receive a communication directed to a second unit for communications;
   b. a second network element being in communication with the first network element wherein the second network element determines whether the communication to the second unit is a toll communication by determining geographic locations of the first and second network elements and comparing the geographic locations of the first and second network elements to a billing plan of the user.

8. The system of claim 7, wherein the second network unit sends an alert to the first network element indicating the nature of the call.

9. The system of claim 8, wherein the first network element is a switch.

10. The system of claim 7, wherein the second network element is a service control point.

11. The system of claim 7, wherein the first network element notifies the user by an alert selected from the group consisting of a pre-recorded audible message, an audible tone, an indicator light, an icon, a short message or an option to be forwarded to a interactive response unit.

12. The system of claim 1, wherein the user's billing plan includes information concerning a billing party.

13. The system of claim 7, wherein the second network element further determines whether the user is a billing party if the communication is determined to be the toll communication.

14. The system of claim 7, wherein the second network element further determines whether a received party of the communication is an authorized party for the communication.

15. The system of claim 7, wherein the second network element further determines whether a received party of the communication desires the user to send another type of communication.

* * * * *